(12) United States Patent
Holuka

(10) Patent No.: US 6,557,676 B2
(45) Date of Patent: May 6, 2003

(54) INNOVIA VEHICLE LOCK-ON DEVICE

(75) Inventor: Robert P. Holuka, West Mifflin, PA (US)

(73) Assignee: DaimlerChrysler Rail Systems (Technology), Pittsburgh, PA (US)

( * ) Notice: Subject to any disclaimer, the term of this patent is extended or adjusted under 35 U.S.C. 154(b) by 0 days.

(21) Appl. No.: 09/767,276

(22) Filed: Jan. 23, 2001

(65) Prior Publication Data

US 2002/0096413 A1 Jul. 25, 2002

(51) Int. Cl.⁷ .................................................. B60L 5/00
(52) U.S. Cl. ........................ 191/45 R; 191/49; 104/243
(58) Field of Search .......................... 191/45 R, 22 R, 191/23 R, 48, 49; 104/248, 243

(56) References Cited

U.S. PATENT DOCUMENTS

| | | | |
|---|---|---|---|
| 327,381 A | * 9/1885 | Clay | 191/29 R |
| 332,926 A | * 12/1885 | McLaughlin | 104/63 |
| 356,579 A | * 1/1887 | Erhardt | 104/63 |
| 936,682 A | 10/1909 | Vandergrift | |
| 1,623,920 A | 4/1927 | Harris | |
| 2,903,526 A | * 9/1959 | Mattox | 191/49 |
| 3,006,286 A | * 10/1961 | Bacon et al. | 104/63 |
| 3,715,991 A | 2/1973 | Boyd | |
| 4,015,537 A | 4/1977 | Graef et al. | |
| 4,043,436 A | * 8/1977 | Segar et al. | 191/32 |
| 4,089,272 A | * 5/1978 | Schmitz | 104/247 |
| 4,207,821 A | 6/1980 | Beckert | |
| 4,888,454 A | * 12/1989 | Scarpatetti et al. | 191/30 |
| 5,174,217 A | 12/1992 | Wakabayashi | |
| 5,289,778 A | 3/1994 | Romine | |
| 5,421,268 A | 6/1995 | Roberts et al. | |
| 5,511,488 A | 4/1996 | Powell et al. | |
| 5,592,883 A | 1/1997 | Andress, III | |
| 5,669,472 A | * 9/1997 | Azzouni | 191/49 |
| 6,070,703 A | * 6/2000 | Azzouni | 191/49 |
| 6,129,028 A | * 10/2000 | Shaw | 105/72.2 |

* cited by examiner

*Primary Examiner*—S. Joseph Morano
*Assistant Examiner*—Frantz F. Jules
(74) *Attorney, Agent, or Firm*—Webb Ziesenhiem Logsdon Orkin & Hanson P.C.

(57) ABSTRACT

Disclosed is a lock-on device including a member and a grounding pad. A first end of the member is configured to be connected to a guide frame of a rail vehicle. The grounding pad is attached to a second end of the member. The grounding pad may be attached to the member in any location suitable for collecting ground from the guide beam during use. A pair of lock-on devices is installed on the vehicle, such that one is located on each side of the guide beam. Since the lock-on device is attached to the guide frame of the vehicle and engages the underneath of the guide beam, any force tending to tip the vehicle will cause the lock-on device to "grab" the guide beam. The relationship of the guide beam and the grounding pad prevents the vehicle from tipping. Thus, track jumping and roll over are inhibited.

8 Claims, 3 Drawing Sheets

INNOVIA VEHICLE LOCK-ON DEVICE

BACKGROUND OF THE INVENTION

1. Field of the Invention

The present invention is directed to a rail vehicle and, more particularly, to a lock-on device for securing a rail vehicle to a guide beam and for collecting electrical ground.

2. Description of the Prior Art

Currently, a rail vehicle travels on a guide way comprised of a flat surface and a guide beam. The rail vehicle rides on the flat surface on a set of tires and is guided along the path of travel dictated by the guide beam by guide wheels. The guide wheels are positioned horizontally and ride on an outer surface of a flange of the guide beam between upper and lower lips of the flanges. The guide wheels engage the guide beam for directional guidance. Neither the tires, the guide wheels, nor any other structure provide a secure attachment of the vehicle to the guide beam. Only gravitational forces act to retain the vehicle on the guide way and in engagement with the guide beam. Therefore, nothing prevents the rail vehicle from jumping off of the track and/or rolling over during high winds, an accident, or some other phenomenon.

A ground collector including a carbon brush is attached to the vehicle to collect ground for the system. An aluminum extrusion with a copper track is mounted on top of the guide beam. Initial installation of the extrusion and track is costly. In use, the carbon brush moves along the copper track to collect ground. The carbon brush wears easily, especially when the track gets rusty. Thus, the carbon brush requires a significant amount of maintenance and/or replacement.

SUMMARY OF THE INVENTION

It is an object of this invention to provide a device that secures the rail vehicle to the guide beam in order to inhibit vehicle track jumping and/or roll over during high winds, an accident, or other phenomenon.

It is another object of this invention to provide a device for the collection of ground.

Accordingly, we have developed a lock-on device for a rail vehicle. This device not only secures the rail vehicle to the guide beam to inhibit vehicle track jumping and/or roll over, but also serves as a ground collector.

The lock-on device of the present invention includes a member and a grounding pad. A first end of the member is configured to be connected to a guide frame of the rail vehicle. The grounding pad is attached to a second end of the member. The grounding pad may be attached to the member in any location suitable for collecting ground from the guide beam during use.

A pair of lock-on devices is installed on the vehicle, such that one is located on each side of the guide beam. Since the lock-on device is attached to the guide frame of the vehicle and engages the underneath of the guide beam, any force tending to tip the vehicle will cause the lock-on device to "grab" the guide beam. The relationship of the guide beam and the grounding pad prevents the vehicle from tipping. Thus, track jumping and roll over are inhibited.

DESCRIPTION OF THE PREFERRED EMBODIMENTS

Figure 1:
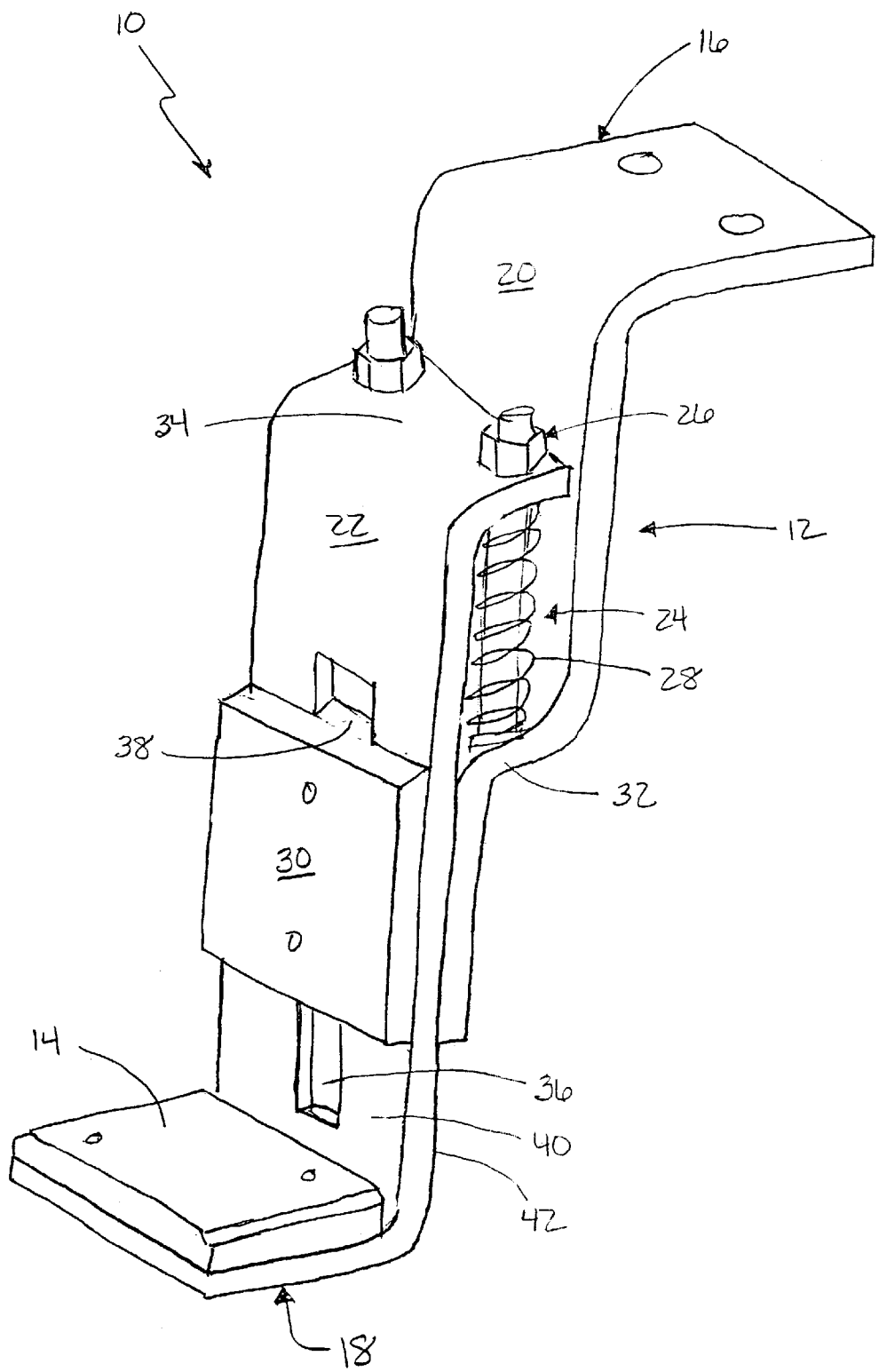
FIG. 1 is a perspective view of a lock-on device.
Figure 2:
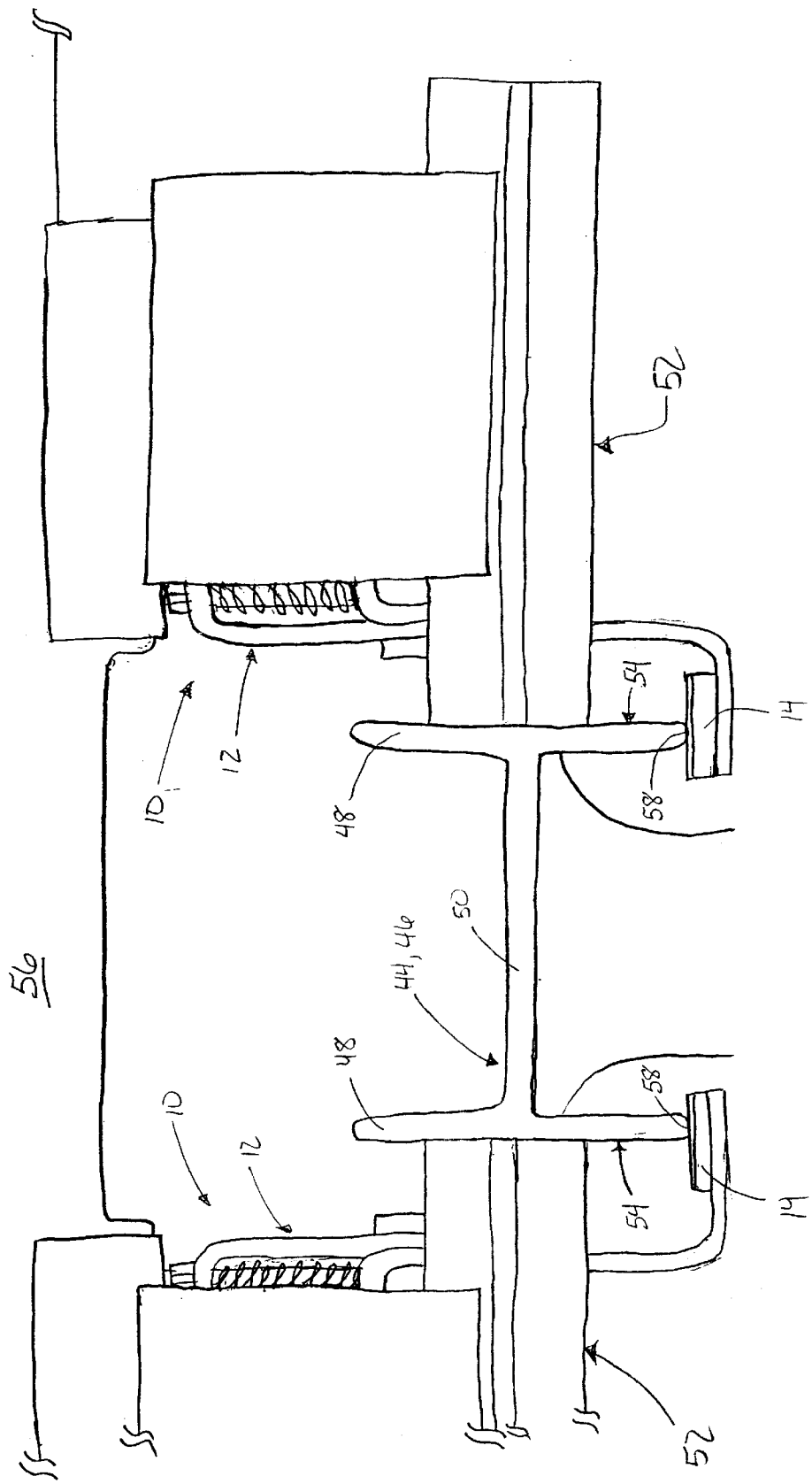
FIG. 2 is a front view of the lock-on device of FIG. 1 installed on a rail vehicle.

FIGS. 1–2 illustrate a lock-on device 10 of the present invention for use with rail vehicles that ride on guide ways having guide beams to direct the vehicles. The lock-on device includes a member 12 and a grounding pad 14. A first end 16 of the member 12 is configured to be connected to a guide frame 64 (see FIG. 3) of a rail vehicle 56. The member 12 is preferably constructed of steel. The grounding pad 14 is attached to a second end 18 of the member 12. The grounding pad 14 is preferably attached to the member 12 such that the grounding pad 14 may be removed from the member 12 as necessary for repair or replacement. The grounding pad 14 may be attached to the member 12 in any location suitable for collecting ground from a guide beam 44 during use. The grounding pad 14 is preferably constructed of a copper alloy, but other conductive metallic materials may be used.

The member 12 preferably includes a first portion 20, a second portion 22, and at least one spring assembly 24. The first portion 20 includes the first end 16 that connects to the guide frame 64. The second portion 22 includes the second end 18 to which the grounding pad 14 attaches. The at least one spring assembly 24 interconnects the first portion 20 and the second portion 22 and biases the grounding pad 14 against the guide beam 44 in order to ensure that the grounding pad 14 properly engages the guide beam 44. The at least one spring assembly 24 may include a bolt and nut 26 to adjust the tension in a spring 28 of the at least one spring assembly 24.

The member 12 may also include a third portion 30. In this embodiment, the at least one spring assembly 24 is positioned between a flange 32 of the first portion 20 and a flange 34 of the second portion 22. The second portion 22 further includes a slot 36 and the third portion 30 includes a key 38 configured to be insertable into and slideably movable within the slot 36 of the second portion 22. The slot 36 receives the key 38 on a first surface 40 of the second portion 22. The third portion 30 is attached, using conventional methods, to the first portion 20 that is positioned on a second surface 42 of the second portion 22, thus sandwiching the second portion 22 between the first portion 20 and the third portion 30. The key 38 slides within the slot 36 permitting the spring 28 to vary in tension, thereby biasing the grounding pad 14 against the guide beam 44.

Referring to FIG. 2, the guide beam 44 is typically a horizontally placed I-beam rail 46 having opposed flanges 48 connected by a web 50. One guide wheel 52 engages an outer side 54 of each flange 48. The member 12 is configured such that, when installed on the rail vehicle 56, the grounding pad 14 engages a lower lip 58 of the flange 48 of the guide beam 44. In use, one lock-on device 10 is attached to each side of the guide frame 64 at an approximate mid-point between the guide wheels 52, thus positioning one lock-one device 10 on each side of the guide beam 44 as shown in FIG. 3.

Figure 3:
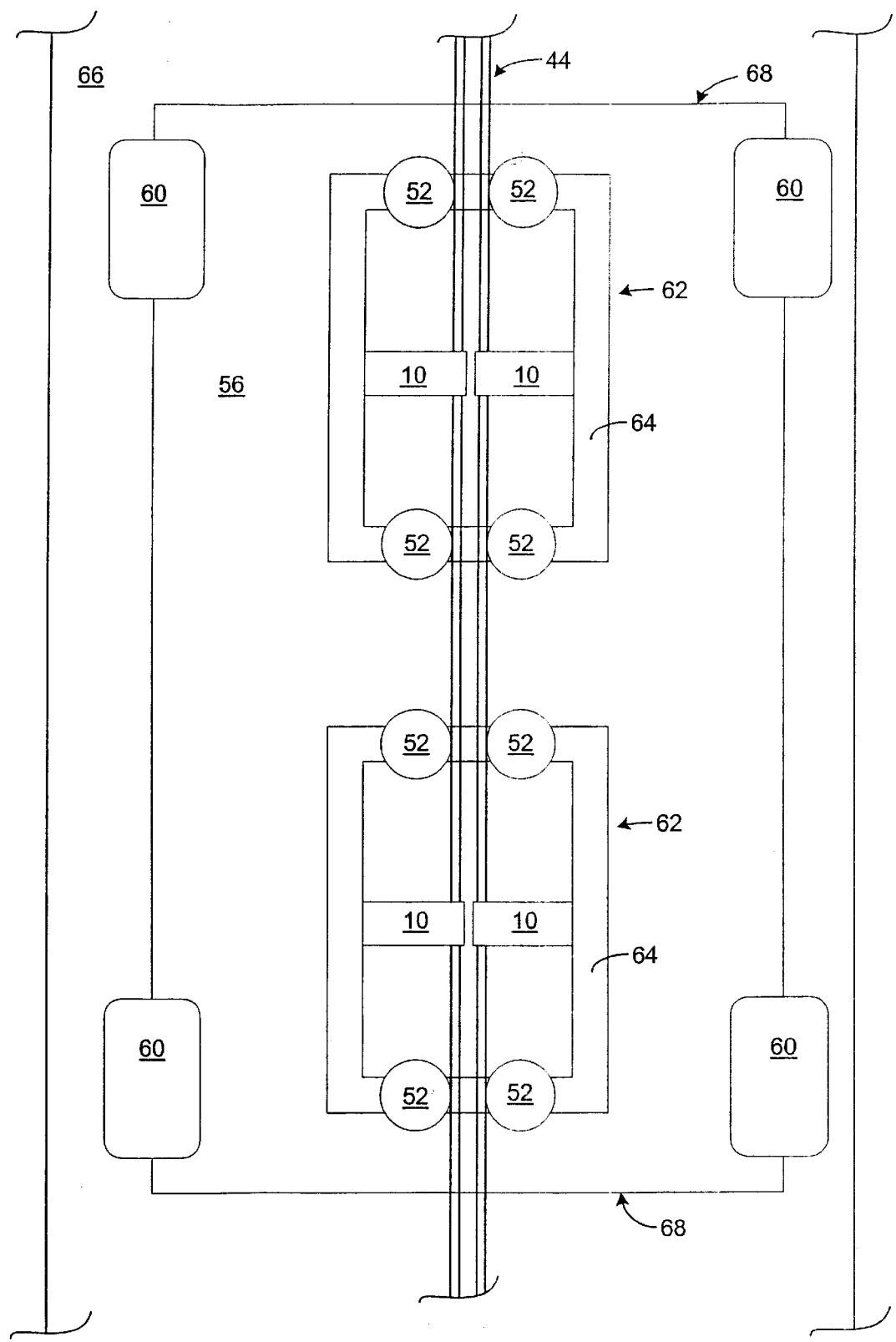
FIG. 3 is a bottom schematic illustration of several lock-on devices of FIG. 1 installed on a rail vehicle.

FIG. 3 is a schematic illustration of the rail vehicle 56 having four lock-on devices 10 installed thereon. This illustration is for demonstrative purposes only—to show the relative positioning of the lock-on devices 10. The illustration is not to scale and may contain some inaccuracies.

Referring to FIG. 3, preferably, four lock-on devices 10 are utilized with the conventional rail vehicle 56 that includes four tires 60 and two guide assemblies 62. Each guide assembly 62 includes a guide frame 64 and four guide wheels 52 configured to engage the guide beam 44 located in a guide way 66 on which the rail vehicle 56 travels. One guide assembly 62 is located near each end 68 of the rail vehicle 56 (more or less than two guide assemblies 62 may be present on the rail vehicle 56). At least one pair of lock-on devices 10 is installed on each guide assembly 62. Given one pair of lock-on devices 10 installed on the rail vehicle 56 as shown in FIG. 3, one lock-on device 10 is positioned on each side of the guide frame 64 between the guide wheels 52, preferably substantially at the mid-point between the guide wheels 52. The first end 16 of the member 12 is attached to the guide frame 64 such that the grounding pad 14 engages the guide beam 44 at the lower lip 58 of the flange 48. The first end 16 may be attached to the guide frame 64 by any conventional attachment methods, for example, bolt and nut.

Once the rail vehicle 56 is positioned onto a guide way 66, the present invention maintains the rail vehicle 56 on the guide beam 44 during high winds, an accident, or other phenomenon that would traditionally cause the rail vehicle 44 to jump track and/or roll over. This is accomplished by having a lock-on device 10 installed on both sides of the guide beam 44. The lock-on device 10 on each side is connected to the rail vehicle 56 through the guide frame 64 and engages the lower lips 58 of the flanges 48 through the grounding pads 14. If something were to exert a force on the rail vehicle 56 to tend it to roll, this configuration and placement of the lock-on devices 10 prevents any disengagement with the guide beam 44. A force to the left would tend the rail vehicle 56 to tip left which causes the lock-on device 10 on the right to grab the flange 48 of the guide beam 44 to prevent tipping, and vice versa.

During rail vehicle 56 travel, the substantially constant engagement of the grounding pads 14 with the guide beam 44 provides a source of ground for the system.

It will be understood by those skilled in the art that while the foregoing description sets forth in detail preferred embodiments of the present invention, modifications, additions, and changes might be made thereto without departing from the spirit and scope of the invention.

I claim:

1. A lock-on device for securing a rail vehicle to a guide beam, the rail vehicle having at least one pair of guide wheels and a guide frame, the at least one pair of guide wheels attached to opposed sides of the guide frame and configured to engage opposed sides of the guide beam, the lock-on device comprising:

a member having a first end and a second end, the first end configured to connect to the guide frame; and a grounding pad attached to the second end and configured to engage a lower surface of the guide beam, wherein, when the first end is connected to the guide frame and the grounding pad is engaged with the lower surface of the guide beam, the lock-on device secures the rail vehicle to the guide beam and is positioned to collect ground.

2. The lock-on device according to claim 1, further including at least one spring assembly configured to bias the lock-on device in substantially constant engagement with the guide beam.

3. The lock-on device according to claim 2, wherein the spring assembly is adjustable.

4. A lock-on device for securing a rail vehicle to a guide beam, the rail vehicle having at least one pair of guide wheels and a guide frame, the at least one pair of guide wheels attached to opposed sides of the guide frame and configured to engage opposed sides of the guide beam, the lock-on device comprising:

a member having a first end and a second end, the first end configured to connect to the guide frame;

a grounding pad attached to the second end and configured to engage a lower surface of the guide beam; and at least one spring assembly configured to bias the lock-on device in substantially constant engagement with the guide beam, wherein the spring assembly is adjustable, the member includes a first portion, a second portion, and a third portion, the first portion includes the first end, the at least one spring assembly interconnects the first portion and the second portion, the second portion includes the second end and a slot, the third portion includes a key removeably insertable into and slideable within the slot, and the key is inserted into the slot on a first surface of the second portion, the third portion is connected to the first portion that is adjacent at a second surface of the second portion, whereby the key slides within the slot causing the first portion and the third portions to slide relative to the second portion permitting an increase or decrease in the tension in the at least one spring assembly.

5. A system for securing a rail vehicle to a guide beam while collecting electrical ground, the rail vehicle having a guide frame and two pairs of guide wheels and adapted to ride on the guide beam, the system comprising:

at least one pair of lock-on devices, each lock-on device including a flange at a first end and a collecting pad at a second end, the flange connected to the guide frame of the rail vehicle, and the collecting pad engaging a bottom lip of a flange of the guide beam, wherein, one lock-on device is positioned on each side of the rail vehicle, and during travel of the rail vehicle, the grounding pad collects electrical ground through contact with the flange of the guide beam, wherein at least one of the at least one pair of lock-on devices secures the rail vehicle to the guide beam.

6. The system according to claim 5, wherein:

the first end is a separate member from the second end, and each lock-on device further includes at least one spring assembly positioned between the first end and the second end, the at least one spring assembly configured to enable the first end and the second end to move in relation to each other to maintain the grounding pad in substantially constant engagement with the guide beam.

7. A method for installing at least one pair of lock-on devices on a rail vehicle that rides on a horizontal I-beam guide beam of a top surface of a guide way, the rail vehicle having a guide frame and two pairs of guide wheels, the method of installing the at least one pair of lock-on devices comprising the steps of:

providing each lock-on device with a member and a grounding pad, the member having a first end configured to connect to the guide frame and a second end, and the grounding pad attached to the second end of the member and configured to engage a bottom surface of the guide beam which is opposed to the top surface of the guide way, positioning one of the pair of lock-on devices on each side of the guide frame of the rail vehicle substantially midway between one pair of the two pairs of guide wheels, and connecting the first end of the member to the guide frame of the rail vehicle such that the grounding pad engages the bottom surface of the guide beam.

8. The method according to claim 7, further including the step of providing the lock-on device with at least one spring assembly, the at least one spring assembly configured to bias the grounding pad against the guide beam.

* * * * *